United States Patent
Bynoe

(10) Patent No.: US 9,940,739 B2
(45) Date of Patent: Apr. 10, 2018

(54) GENERATING INTERACTIVELY MAPPED DATA VISUALIZATIONS

(71) Applicant: Accenture Global Services Limited, Dublin (IE)

(72) Inventor: Joseph Bynoe, San Francisco, CA (US)

(73) Assignee: Accenture Global Services Limited, Dublin (IE)

( * ) Notice: Subject to any disclaimer, the term of this patent is extended or adjusted under 35 U.S.C. 154(b) by 32 days.

(21) Appl. No.: 14/839,032

(22) Filed: Aug. 28, 2015

(65) Prior Publication Data
US 2017/0061656 A1   Mar. 2, 2017

(51) Int. Cl.
*G06T 11/20* (2006.01)
*G06Q 10/00* (2012.01)

(52) U.S. Cl.
CPC ............ *G06T 11/206* (2013.01); *G06Q 10/00* (2013.01)

(58) Field of Classification Search
CPC ............ G06F 9/45558; G06F 9/45533; G06F 9/5077; G06F 9/5083; G06F 2009/4557; G06F 9/5044; G06F 9/505; G06F 11/008; G06F 11/3419; G06F 11/3433; G06F 11/3442; G06F 11/3447; G06F 11/3476; G06F 11/3495; G06F 15/173; G06F 17/30289; G06F 2009/455; G06F 2209/485; G06F 2209/501; G06F 2209/503; G06F 9/06; G06F 9/4856; G06F 9/4881; G06F 9/5027; G06F 9/5072; G06F 9/5094; G06F 9/52; G06Q 10/00; G06Q 10/06; G06Q 10/06315; G06Q 10/0633; G06Q 30/0633; H04L 43/06; H04L 43/045; H04L 43/062
See application file for complete search history.

(56) References Cited

U.S. PATENT DOCUMENTS

| | | | |
|---|---|---|---|
| 6,088,064 A | 7/2000 | Rumreich et al. | |
| 6,578,077 B1 | 6/2003 | Rakoshitz et al. | |
| 8,239,538 B2 | 8/2012 | Zhang et al. | |
| 8,396,807 B1 | 3/2013 | Yemini et al. | |
| 8,463,900 B2 | 6/2013 | Dasgupta et al. | |
| 8,464,255 B2 | 6/2013 | Nathuji et al. | |
| 8,707,300 B2 | 4/2014 | Govindan et al. | |

(Continued)

OTHER PUBLICATIONS

Pileggi, Hannah, et al. "Snapshot: Visualization to propel ice hockey analytics." IEEE Transactions on Visualization and Computer Graphics 18.12 (2012): 2819-2828.*

(Continued)

*Primary Examiner* — Sultana M Zalalee
(74) *Attorney, Agent, or Firm* — Brinks Gilson & Lione

(57) ABSTRACT

A method and systems for generating interactively mapped data visualizations are provided. The system includes geocoded data and a user interface for displaying visualized geocoded data. A visualization circuitry is configured to access the time-series geocoded data, obtain activity data, develop relationship data according to the obtained activity data to reflect relationships among the time-series geocoded data, select a data display mode and process the time-series geocoded data by receiving a selection, generating an area map, filtering the time series geocoded data, associating the relationship data with the filtered time series geocoded data, transforming the filtered time series geocoded, and generating a display of the displayable data.

21 Claims, 9 Drawing Sheets

(56) References Cited

U.S. PATENT DOCUMENTS

| | | | |
|---|---|---|---|
| 8,909,785 | B2 | 12/2014 | Franco et al. |
| 9,449,003 | B1* | 9/2016 | D'amour ............ G06F 17/30061 |
| 2003/0158930 | A1 | 8/2003 | McBride |
| 2005/0097161 | A1* | 5/2005 | Chiou .................. H04W 16/18 709/200 |
| 2005/0160423 | A1 | 7/2005 | Bantz et al. |
| 2006/0036743 | A1 | 2/2006 | Deng et al. |
| 2007/0143796 | A1 | 6/2007 | Malik |
| 2007/0279494 | A1 | 12/2007 | Aman et al. |
| 2008/0019603 | A1 | 1/2008 | Rahmes et al. |
| 2008/0154837 | A1 | 6/2008 | Morimura et al. |
| 2009/0083103 | A1* | 3/2009 | Basser .................. G06Q 10/00 705/7.39 |
| 2009/0085915 | A1 | 4/2009 | Kelley et al. |
| 2009/0189982 | A1* | 7/2009 | Tawiah .............. A63B 24/0006 348/157 |
| 2009/0241108 | A1 | 9/2009 | Edwards et al. |
| 2010/0069035 | A1 | 3/2010 | Johnson |
| 2010/0162170 | A1* | 6/2010 | Johns ........................ G04G 9/06 715/834 |
| 2010/0205602 | A1 | 8/2010 | Zedlewski et al. |
| 2011/0013087 | A1 | 1/2011 | House et al. |
| 2011/0013836 | A1 | 1/2011 | Gefen et al. |
| 2011/0082935 | A1 | 4/2011 | Zetterman et al. |
| 2011/0131307 | A1 | 6/2011 | El Bazzal et al. |
| 2011/0153805 | A1 | 6/2011 | Beninghaus et al. |
| 2011/0302578 | A1 | 12/2011 | Isci et al. |
| 2012/0094639 | A1 | 4/2012 | Carlson et al. |
| 2012/0179432 | A1 | 7/2012 | Wivell et al. |
| 2013/0005512 | A1* | 1/2013 | Joseph ............... A63B 24/0075 473/431 |
| 2013/0151712 | A1 | 6/2013 | O'Sullivan et al. |
| 2013/0290207 | A1* | 10/2013 | Bonmassar ............ G06Q 10/06 705/321 |
| 2014/0195019 | A1 | 7/2014 | Thurman et al. |
| 2014/0233719 | A1* | 8/2014 | Vymenets ........... H04M 3/5183 379/265.03 |
| 2014/0258539 | A1 | 9/2014 | Heninger et al. |
| 2014/0337763 | A1* | 11/2014 | Feldstein .............. G06F 3/0481 715/753 |
| 2015/0379767 | A1 | 12/2015 | Inoue et al. |

OTHER PUBLICATIONS

Perin, Charles, Romain Vuillemot, and Jean-Daniel Fekete. "SoccerStories: A kick-off for visual soccer analysis." IEEE transactions on visualization and computer graphics 19.12 (2013): 2506-2515.*
Espn, [online][retrieved from: http://scores.espn.com/nhl/gamecast?gameId=400047896] [posted on: Mar. 29, 2012)][retrieved on Feb. 3, 2017].*
Keim, Daniel A., et al. "Monitoring network traffic with radial traffic analyzer." Visual Analytics Science and Technology, 2006 IEEE Symposium on. IEEE, 2006.*
Draper, Geoffrey M., Yarden Livnat, and Richard F. Riesenfeld. "A survey of radial methods for information visualization." IEEE transactions on visualization and computer graphics 15.5 (2009): 759-776.*
Sampai, Altino and Barbosa, Jorge G., "Last-Level Cache Interference-Aware Scheduling in Scientific Clouds," Parallel & Cloud Computing—PCC vol. 2, Issue 4, pp. 116-125, www.vikingpub.com.
International Search Report and Written Opinion dated Sep. 4, 2014 for PCT Application No. PCT/US2014/031600 (5 pp.).
Patent Examination Report No. 3 from corresponding Australian patent application No. 2014235873 dated Mar. 7, 2017 (4 pages).
"Smoothing"—Wikipedia, the free encyclopedia, http://web.archive.org.web/20120917190142/https://en.wikipedia.org/wiki/Smoothing, published on Sep. 17, 2012 as per Wayback Machine (2 pages).
"Aggregating Data to Grid Cells", *Spatial Python*, http://web.archive.org/web/20100205101222/http://sites.google.com/site/spatialpython/aggregating-data-to-grid-cells, published on Feb. 5, 2012 as per Wayback Machine (8 pages).
Buja, Andreas et al., "Linear Smoothing and Additive Models", *The Annals of Statistics*, Jun. 1989, vol. 17, No. 2, pp. 453-510 (58 pages).
Patent Examination Report No. 4 from corresponding Australian patent application No. 2014235873 dated May 22, 2017 (5 pages).
Office Action dated Mar. 31, 2017 for Canadian Patent Application No. 2,937,093 (4 pages).
Final Office Action dated Nov. 1, 2016 for U.S. Appl. No. 14/223,312 (34 pp.).
Patent Examination Report No. 2 dated Oct. 13, 2016 for Australian Patent Application No. 2014235873 (5 pp.).
Patent Examination Report No. 1 dated Oct. 17, 2016 for Australian Patent Application No. 2016219607 (7 pp.).
Patent Examination Report No. 1 dated Sep. 22, 2016 for Australian Patent Application No. 2016206330 (5 pp.).
"Aggregating Data to Grid Cells," *Spatial Python*, http://sites.google.com/site/spatialpython/aggregating-data-to-grid cells, printed on Nov. 18, 2016 (7 pp.).
Beshai, Peter, "Buckets: Basketball Shot Visualization," University of British Columbia, published Dec. 2014, https://www.cs.ubc.ca/~tmm/courses/547-14/projects/peter/report.pdf (19 pp.).
Buja, Andreas et al., "Linear Smoothing and Additive Models," *The Annals of Statistics*, 1989, vol. 17, No. 2, 453-510 (58 pp.).
"Football Matchday Widget Showcase," Opta Sports, https://web.archive.org/web/20130901042706/http://www.optasports.com/football-matchday-widget-showcase.aspx (4 pp.).
Knutson, Ted, "Visualizing Eden Hazard," https://thechels.co.uk/4717-visualizing-eden-hazard/, Feb. 2, 2014 (6 pp.).
"2012 Matrix," Opta Sports, https://web.archive.org/web/20130420075948/http://www.optasports.com/ImageGen.ashx?image=/media/456902/media.jpg&width=646&height=294 (1 pp.).
Australia Patent Office, Examination Report No. 2 for Australia Patent Application No. 2016219607 dated Mar. 21, 2017, 4 pages.
Australia Patent Office, Examination Report No. 3 for Australia Patent Application No. 2016219607 dated Jul. 7, 2017, 4 pages.
Australia Patent Office, Examination Report No. 4 for Australia Patent Application No. 2016219607 dated Sep. 4, 2017, 4 pages.

* cited by examiner

GENERATING INTERACTIVELY MAPPED DATA VISUALIZATIONS

FIELD OF THE TECHNOLOGY

The disclosure relates to the field of data visualizations, and more particularly, it relates to a system and method for generating interactively mapped data visualizations.

BACKGROUND OF THE TECHNOLOGY

Data visualization may communicate information clearly and efficiently to viewers via the statistical graphics, plots or specially designed information graphics. Effective visualization helps viewers in analyzing and reasoning about data collected. Data visualization may make complex data easily understandable and accessible. The rapid advances in technology have resulted in computing devices with continually increasing data processing capability. The advanced data processing technology may be used to read and analyze geocoded data and generate visualizations for viewers to assess and understand complex geocoded data.

SUMMARY

Examples of the present disclosure provide at least a system and a method for generating interactively mapped data visualizations.

In one embodiment, the present disclosure provides a system that may include a memory storing time-series geocoded data, visualization circuitry in communication with the memory. The visualization circuitry may be configured to: access the time-series geocoded data from the memory, obtain activity data that is embedded with the time-series geocoded data, develop relationship data according to the obtained activity data to reflect relationships among the time-series geocoded data, select a data display mode from a plurality of pre-determined data display modes for the time-series geocoded data based on the activity data and the data relationship.

The visualization circuitry of the system may be configured to process the time-series geocoded data by: receiving a selection of the data display mode, generating an area map for the selected data display mode, filtering the time series geocoded data to obtain a subset of data based on the data display mode, associating the relationship data with the filtered time series geocoded data, transforming the filtered time series geocoded data and the relationship data to displayable data according to the activity data, the relationship data and the selected data display mode; and generating a display of the displayable data in the area map according to the relationship data and the activity data.

In another embodiment, the present disclosure provides a method that may include storing geocoded data into a memory, displaying a streaming video in a display device, and receiving, by visualization circuitry, a streaming video signal from the memory. The method may also include developing by the visualization circuitry a commentary message to be displayed according to the received streaming video signal, accessing by the visualization circuitry the geocoded data from the memory, selecting by the visualization circuitry a subset of the geocoded data according to the streaming video signal, generating by the visualization circuitry a user interface for the display device having a first area adjacent to a second area adjacent to a third area, processing by the visualization circuitry the streaming video signal to generate a streaming video display in the first area of the user interface, processing by the visualization circuitry the selected subset of geocoded data to generate a display of the selected subset of geocoded data in an area map in the second area of the user interface, said display of the selected subset of geocoded data being synchronized with the streaming video display, and processing by the visualization circuitry the commentary message to generate a display that is associated with the commentary message being synchronized with the streaming video display.

BRIEF DESCRIPTION OF THE DRAWINGS

The system and/or method may be better understood with reference to the following figures and descriptions. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION OF ILLUSTRATED EXAMPLES

The purpose, technical proposal and advantages in the examples of the present disclosure will be clear and complete from the following detailed description when taken in conjunction with the appended drawings. The examples described herein are merely a part of examples of the present disclosure, not all examples. Persons skilled in the art may obtain all other examples without creative works, based on these examples.

A human may distinguish differences in visualized graphics such as line length, shape orientation and colors readily without significant processing effort. As such, data visualization may communicate information clearly and efficiently to viewers by using the statistical graphics, plots or specially designed information graphics. Effective visualization thus helps viewers in analyzing and reasoning about data collected, and data visualization may make complex data easily understandable and accessible.

Geocoded data are data with coordinates. The visualization of geocoded data may help viewers to easily understand the complex data with coordinates. Furthermore, the advanced data processing technology may be used to read and analyze geocoded data and develop various visualizations to show relationships among the geocoded data. The developed visualizations may show the inherent relationships among geocoded data and such inherent relationships may not be readily available by looking at the geocoded data itself.

Figure 1:
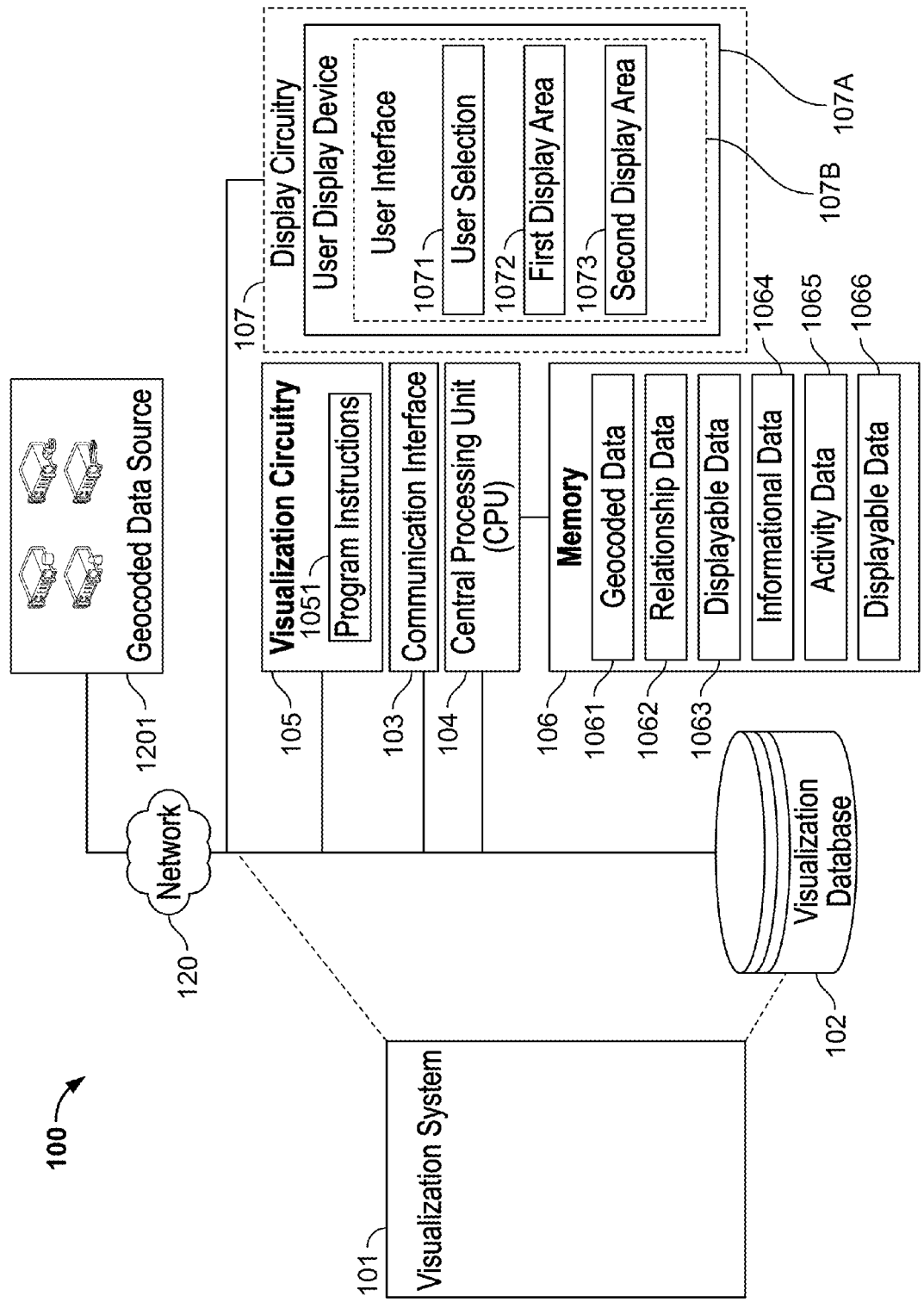
FIG. 1 shows an example system diagram that depicts the system for generating interactively mapped data visualizations.

FIG. 1 shows an example system diagram that depicts the system for generating interactively mapped data visualizations 100. As shown in FIG. 1, a visualization system 101 may include a memory 106 that may store geocoded data 1061. The geocoded data 1061 may be received from a geocoded data source 1201 via network 120.

There may be several geocoded data sources 1201. One of the geocoded data sources may be sports data providers. The sport data providers may provide statistics for a sports game, a hockey game for example. Such statistics may include conference, division, games, teams, broadcast providers, addresses of the game, coaches, profiles of players, game time, events of the game such as: shots, assists, goals, hits, penalties, etc. The statistics may also include X and Y coordinates of the events of the game. As such, the geographical location of the sports events for a sports game may be obtained.

The geocoded data 1061 may be time-series geocoded data. The obtained geocoded data 1061 may be stored in the visualization database 102 and may be read and stored in the memory 106. The geocoded data 1061 record may be for a specific time. For example, the geocoded data for a hockey game may have a timestamp for each data record. The statistics included in the geocoded data may be for a particular time. For example, the events of the game such as: shots, assists, goals, hits, penalties having coordinates for a hockey game may be collected and stored for a specific time.

As in FIG. 1, the visualization system 101 may include visualization circuitry 105 that may be in communication with the memory 106. The visualization circuitry 105 may include program instructions 1051. The program instructions 1051 of the visualization circuitry 105 may be configured to perform various functions of the visualization circuitry 105. For example, the program instructions of visualization circuitry 105 may be configured to obtain the geocoded data 1061 from geocoded data source 1201 via a communication interface 103 to connect with the network 120. The visualization circuitry 105 may be coupled with a central processing unit (CPU) to connect with the memory 106. The visualization circuitry 105 may access the time-series geocoded data 1061 stored in the memory 106. The visualization circuitry 105 may also obtain activity data 1065 that may be embedded with the time-series geocoded data. For example, along with other data, the geocoded data 1061 may contain hits, shots, assists of a hockey game, the visualization circuitry 105 may obtain the activity data 1065 by extracting hits, shots, assists of a hockey game from the time-series geocoded data 1061.

The visualization circuitry 105 may develop relationship data 1062 according to the obtained activity data 1065. The relationship data 1062 may reflect relationships among the time-series geocoded data. For example, in a hockey game, the playing statistics such as passing activity for each player may be obtained from geocoded data 1061 directly. The visualization circuitry 105 may keep track the coordinates of the hockey ball and develop the passing data as the relationship data 1062 when a player passes the ball to another player. The passing data may include players to pass, the passing distance and passing direction. The passing data may be used to show passing activities of players in a sports competition. For example, by using the relationship data, a matrix for each team in a sports competition may be developed to show passing to and from each player on the team.

As another example for developing relationship data 1062, a player may make a shot from anywhere in a playing field. The coordinates of shooting activity may be available in the geocoded data 1061. The visualization circuitry 105 may calculate the shot accuracy of an area in the playing field for a player and develop the relationship data 1062 that reflects the shot accuracy for a particular area in the playing field for a particular player.

In FIG. 1, the visualization system 101 may include a display circuitry 107 to develop display for a display device 107A. The display device may include a user interface 107B where the user interface 107B may include a user selection 1071 that enable the user to select a data display mode from a plurality of pre-determined data display modes for the time-series geocoded data 1061 based on the activity data 1065 and the data relationship 1062. For example, a list of data visualization selections for the hockey game may be provided, a user may select a data display mode from a selection of data visualizations for the activity data of shots, hits, assists or other statistics etc. The selected data visualization may include relationship data 1062. For example, the assists display mode in a hockey game may include the passing data between two players.

The user selection may include additional criteria. For example, the user selection may include the season for the game, and/or the teams that may compete with each other, and/or players, etc. The user selections may be displayed in the user selection 1071 area of the user interface, and the selected data visualization may be displayed in the first display area 1072.

The visualization system 101 may also develop relationship data 1062 to be displayed as additional information in the user interface 107B. For example, the display data visualization may be for hits data of a hockey game. The green color may be used for offensive and the blue color may be used for defensive hits. The colors of offensive and defensive hits may be developed as the relationship data 1062 may be displayed as additional information in an area map that mimics a hockey rink in the user interface 107B.

As another example, the shot accuracy may be developed and displayed according to the geocoded shots data for a hockey game. The shot accuracy may be calculated by counting the number of shots on target plus the number of goals and dividing by the total number of shots in a specific area. Further, the specific area may be a hexagon area in an area map that mimics a hockey rink in first display area 1072 of the user interface 107B. Both calculated shot accuracy and the hexagon area may be relationship data 1062 to be displayed as additional information in second display area 1073.

The visualization system 101 may process the time-series geocoded data 1061. The process may include receiving a selection of the data display mode and generating an area map of the sports playing field for the selected data display mode 1071. For example, in a hockey game, the data display mode in a selection may be for shots, hits, assists or stats, etc. The area map may depend on the geocoded data 1061 to be displayed. In the hockey, an area map may be generated to mimic the hocking ice rink for displaying hockey game data.

The visualization system 101 may further process the time-series geocoded data 1061. The process may include filtering the time series geocoded data to obtain a subset of data based on the data display mode. For example, when displaying data visualization for shots in a hockey game, only shots data may be needed. Additionally, the shots data may be further filtered by selecting shots data for a particular season and a particular hockey game for display. As such, the process for filtering the time series geocoded data may include multiple filtering processes.

A number of filters may be pre-determined for filtering the time-series geocoded data 1061. For example, the pre-determined filters may a time period, a first attribute category, and a second attribute category. The first attribute category may include shots, hits, assists and stats. The second attribute category may include season for a hockey game, team, and/or players, etc. The filters may be used for filtering by: receiving a selection of a time period to select a first subset of the time series geocoded data, receiving a selection of a first attribute category such as activity data of shots, hits, assists of geocoded data to select a second subset of the time series geocoded data, receiving a selection of a second attribute category such as team, players, season of the game to select a third subset of the time series geocoded data, and retrieving the filtered time series geocoded data commonly contained in the first subset, second subset and third subset of the time series geocoded data.

The visualization system 101 may process the time-series geocoded data 1061 by: associating the relationship data 1062 with the filtered time series geocoded data 1061. The relationship data 1062 may be developed to reflect inherent relationship among geocoded data 1061. For example, shot accuracy for a particular area in a hockey rink may be developed. The time series geocoded data 1061 may be filtered for displaying a particular type of visualized geocoded data 1061 under a particular condition. For example, the shot data for a particular hockey game. As such, the relationship data 1062 may associate with certain filtered time series geocoded data 1061. For example, shot accuracy data for a particular area in a hockey rink may be developed for one particular player's shot data. Thus, the relationship data 1062 may be associated with the filtered time series geocoded data 1061.

The time-series geocoded data 1061 may be transformed by the visualization system 101. The process may include transforming the filtered time series geocoded data 1061 and the relationship data 1062 to displayable data 1066 according to the activity data 1063, the relationship data 1062 and/or the selected data display mode. The geocoded data 1061 may be stored in the memory 106 after the data is filtered. The relationship data 1062 may also be stored in the memory 106 after the relationship data 1062 is developed.

The filtered time-series geocoded data 1061 and the relationship data 1062 may be transformed to displayable data 1066 before they are displayed in the user interface 107A. The displayable data 1066 may be stored in the memory 106. For example, for a hockey game, when activity data 1063 for shots is selected by a user as the data display mode to be displayed, and the relationship data 1062 for shot accuracy is determined and associated with the activity data, a hexagon shape with a grey color may be determined to be used as displayable data 1066. Thus, the filtered time-series geocoded data 1061 and the relationship data 1062 may be transformed to various sizes of hexagons with different grey levels in the area map that mimic the hockey rink for display. The size of the hexagon may represent the number of shots and the grey level may represent the shot accuracy. Also, the bigger size hexagon may represent bigger number of shots made in the hexagon area, and the darker grey level may represent the higher shot accuracy. In practice, the specific size of hexagon and grey level may be determined by using activity data for shots and the calculated relationship data 1062 for shot accuracy for the area.

The visualization of the time-series geocoded data 1061 may be further processed by the visualization system 101. The process may include generating a display of the displayable data 1066 in the area map according to the relationship data 1062 and the activity data 1065. The visualization circuitry 105 may work with display circuitry 107 to generate a display for the displayable data stored in the memory 106. For example, a shot map may be generated in an area map that mimics the hockey rink the size and grey level of the hexagons to be displayed. The relationship data 1062 such as shot accuracy data and activity data 1065 for shots may also be used to generate the display of the displayable data 1066 in the area map.

The visualization system 101 may include an area map that includes a circle to shot types including show goals, on target shots, missed shots in a sports competition for a team in a wheel format. The wheel format may include concentric rings that represent number of shot types, players and team or teams. The concentric rings of the wheel format may include at least three layers. The three layers may include an inner layer representing one or more teams, an outer layer representing the players and a middle layer between the inner layer and the outer layer. The middle layer may represent the short types include shots, hits or assists, etc.

Figure 2:
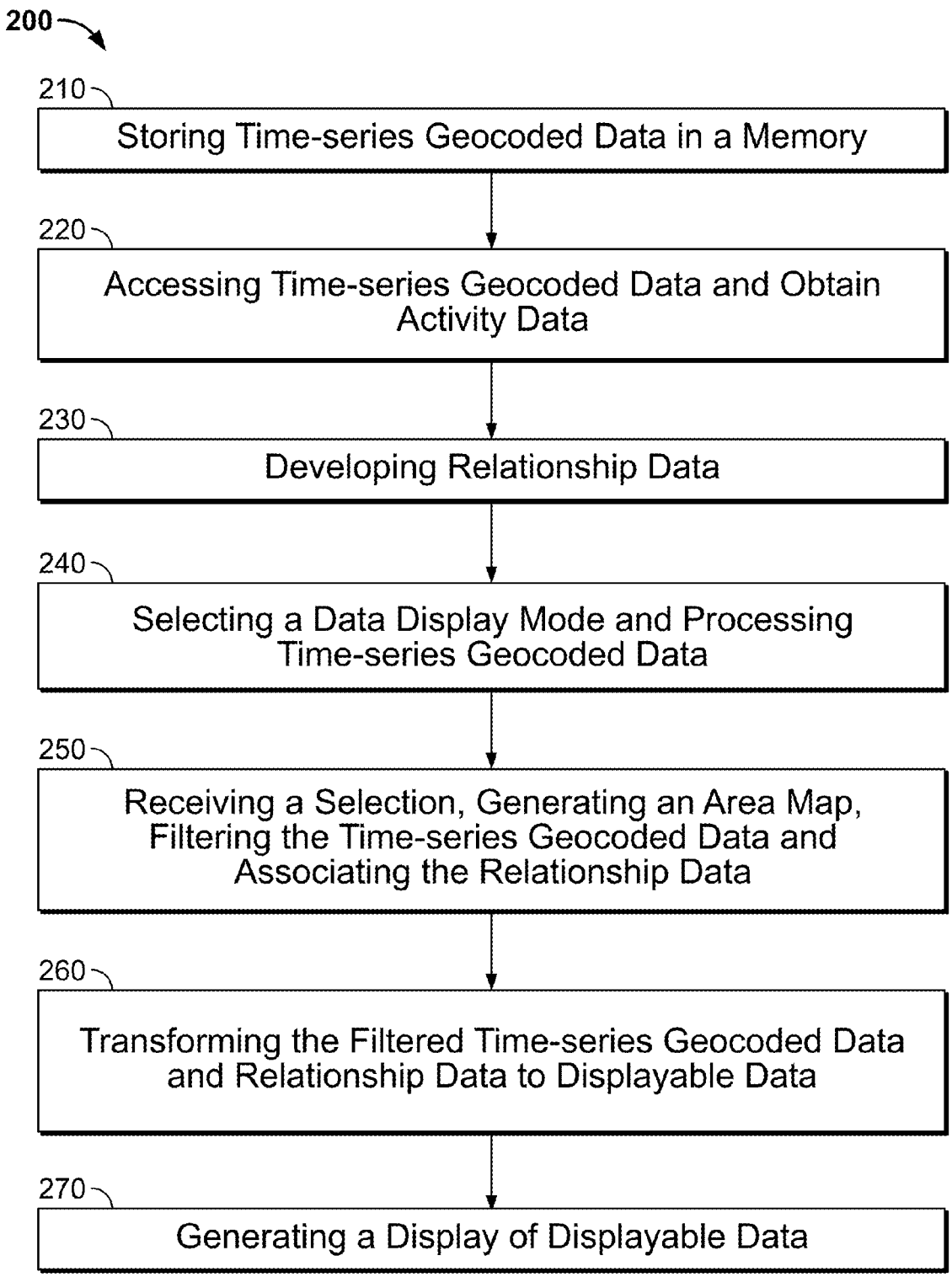
FIG. 2 illustrates an example of high level logic flow of the method for generating interactively mapped data visualizations.

FIG. 2 illustrates an example of high level logic flow of the method for generating interactively mapped data visualizations 200.

The logic 200 may include storing time-series geocoded data in a memory (Step 210). The time-series geocoded data may be received from external sources. The logic 200 may include accessing the time-series geocoded data from the memory and obtaining activity data that is embedded with the time-series geocoded data (Step 220). The stored time-series geocoded data may include various types of data including activity data, the step for obtaining the activity data may include extracting the activity data from the store time-series geocoded data.

The logic 200 may include developing relationship data according to the obtained activity data to reflect relationships among the time-series geocoded data (Step 230). The relationships may not exist in the stored time-series geocoded data. The logic 200 may develop the relationships by using the obtained activity data, and the developed relationship may reflect relationships among the time-series geocoded data.

The logic 200 may also include selecting a data display mode from a plurality of pre-determined data display modes for the time-series geocoded data based on the activity data and the data relationship and processing the time-series geocoded data (Step 240). The display mode may be a pre-determined list that is displayed in a user interface. One display mode may display certain activity data and the data relationship among the time-series geocoded data.

The time-series geocoded data may be processed for generating the visualizations. For processing the time-series geocoded data, the logic 200 may include receiving a selection of the data display mode, generating an area map for the selected data display mode, filtering the time series geocoded data to obtain a subset of data based on the data display mode, and associating the relationship data with the filtered time series geocoded data (Step 250). As part of processing the time-series geocoded data, the logic 200 may include transforming the filtered time series geocoded data and the relationship data to displayable data according to the activity data, the relationship data and the selected data display mode (Step 260), and generating a display of the displayable data in the area map according to the relationship data and the activity data (Step 270).

Figure 3:
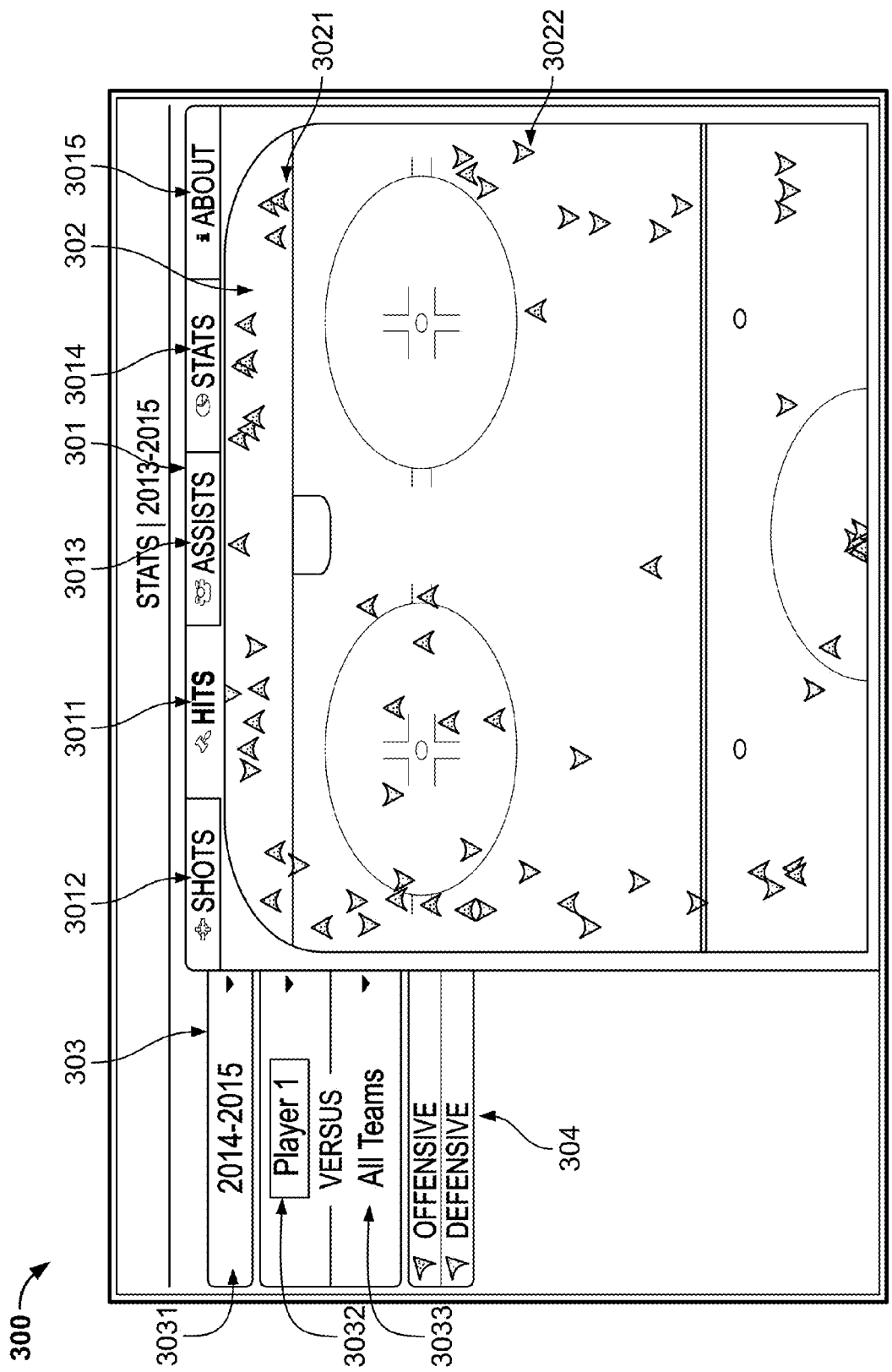
FIG. 3 illustrates a visualization example of geocoded hits data.

FIG. 3 illustrates a visualization example of geocoded hits data 300. As shown in FIG. 3, a selection for display mode 301 is provided. A user may select one display mode from an attribute category including shots 3012, hits 3011, assists 3013 or stats 3014. The description information may be provided in about 3015 tab. In FIG. 3, a user selects the hits 3011 display mode, which is highlighted. A generated area map 302 to mimic a hockey rink is also generated and displayed in FIG. 3. As shown in the informational display 304 in FIG. 3, a green-colored arrow 3021 is for offensive hit, and a blue-colored arrow 3022 is for defensive hit. FIG. 3 also shows an addition selection area 303 for an additional attribute category including season (2014-2015 for example) 3031, player 1 3032 and the opponent team 3033 for player 1. The opponent team 3033 may be a specific team or may be all teams as shown in FIG. 3. Table 1 shows an example of data structure for shots and hits.

TABLE 1

Figure 4A:
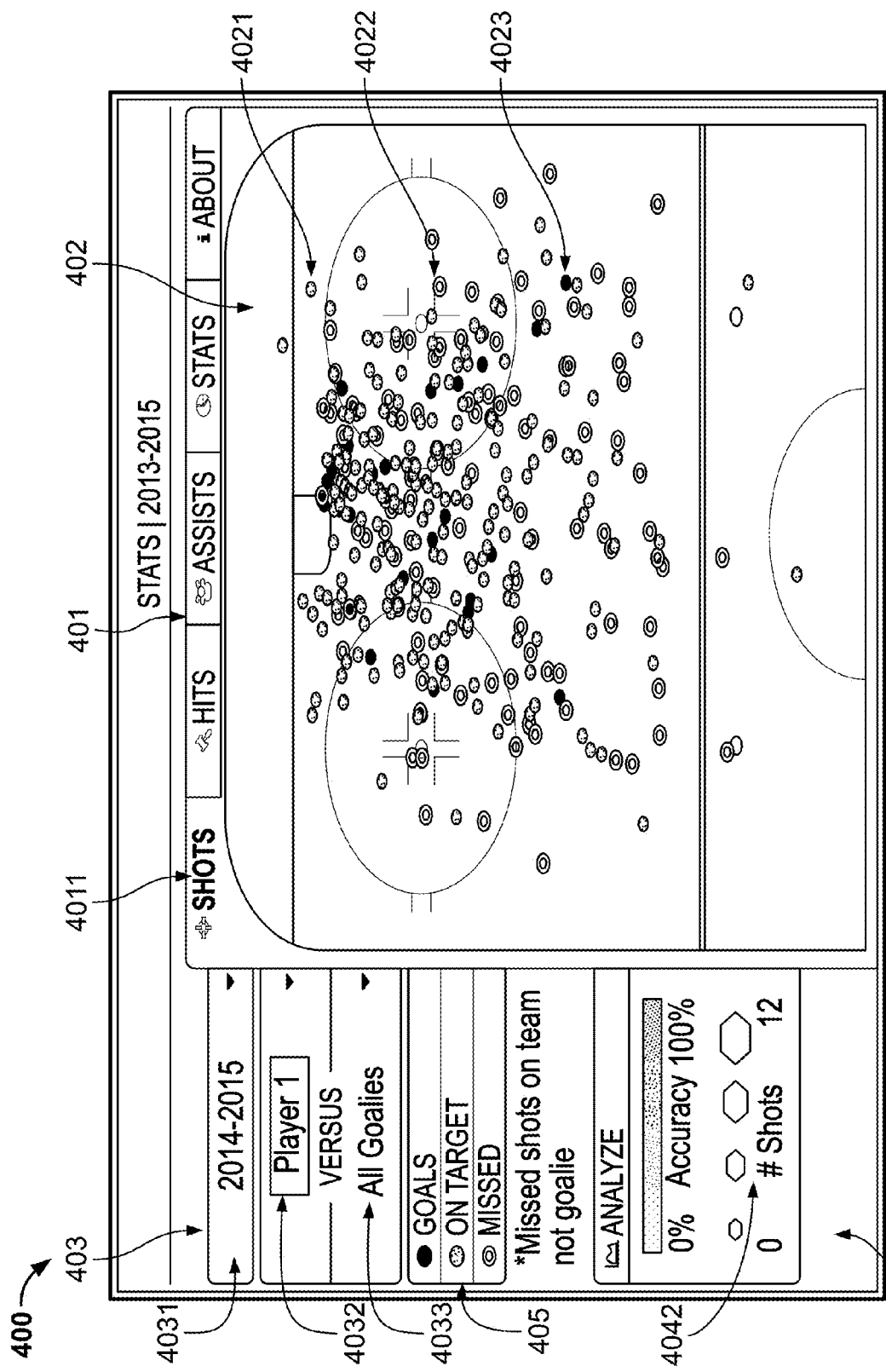
FIGS. 4A-4B illustrate a visualization example of geocoded shots data.
Figure 4B:
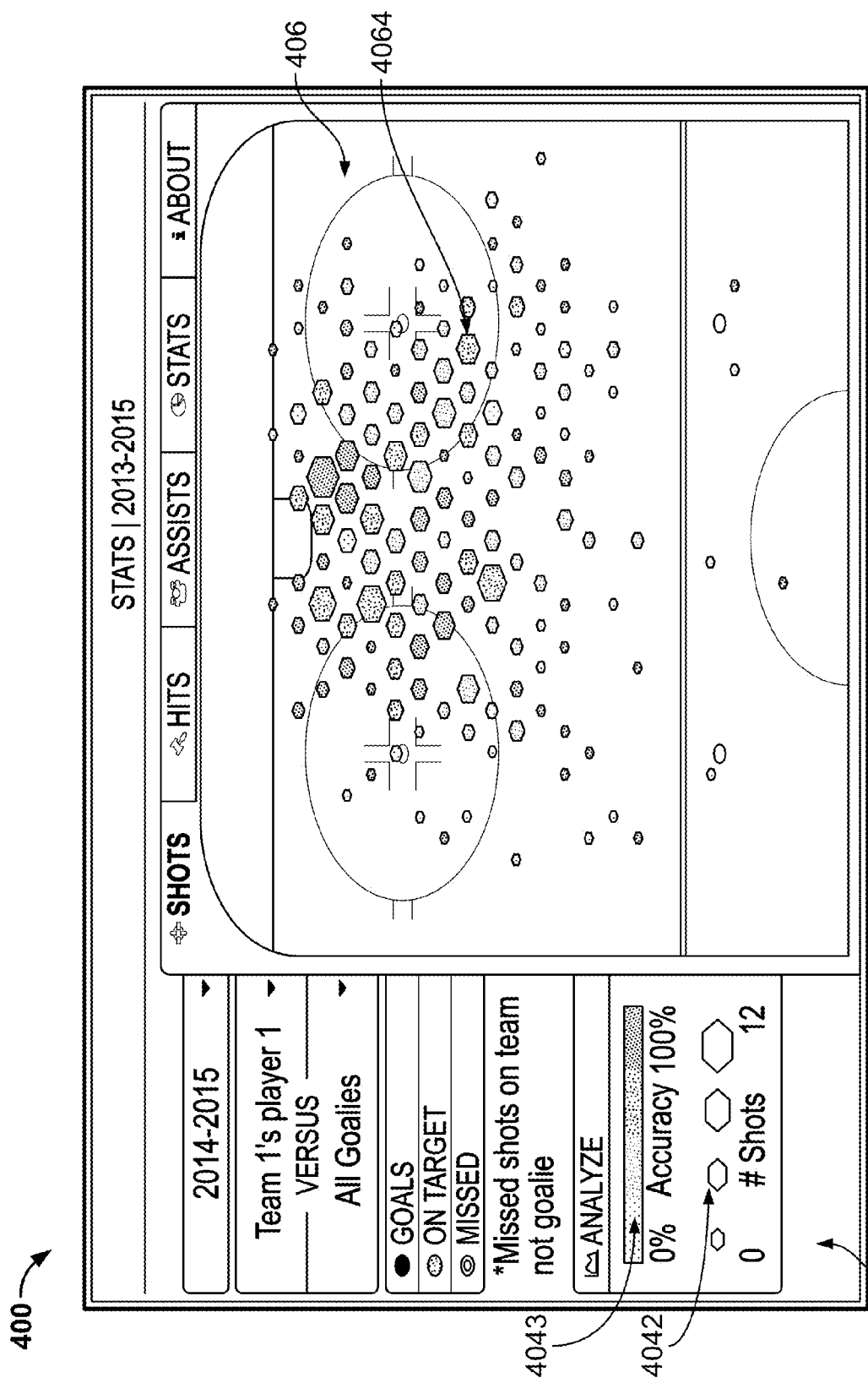

Shots & Hits
    All Players
        Player
            Missed Shots
                XY Coordinates
            On Target
                XY Coordinates
            Goals
                XY Coordinates
            Hits
                XY Coordinates FIGS. 4A-4B illustrate a visualization example of geocoded shots data 400. In FIG. 4A, the display mode selection 401 which is similar to FIG. 3 is provided. The shots 4011 display mode is highlighted after it is selected as shown in FIG. 4A. FIG. 4A also displays an area map 402 to mimic a hockey rink that is similar to FIG. 3. As shown in the additional information area 405 in FIG. 4A, the area map displays shots for goals in black color 4022, on target in gold color 4022 and missed as blue circle 4022. FIG. 4A shows additional attribute category 403 including season (2014-2015 for example) 4031, player (player 1 for example) 4032, and the goalie (or goalies) 4033 for the shots made and displayed in the area map 402. The visualization in area map 402 in FIG. 4A is for shots the player 1 made against all goalies 4033.

In FIG. 4A, a display area to analyze 404 is also provided. FIG. 4B shows the area map with visualization 406 that is associated with the display area to analyze 404. As shown in FIG. 4B, the number of shots relates to various size of the displayable hexagon 4042. The relevant size displayable hexagon 4042 in FIG. 4B also shows in the area map 4064. As shown in FIG. 4B, the bigger the size of the hexagon, the more shots the player made. The analyze area 404 also shows the grey level 4041 for representing the shot accuracy from 0% to 100%. As shown in FIG. 4B, the darker the grey level appears, the more accurate the shot is. The grey level 4043 of each hexagon shows in the hexagon display 4064 in the area map in FIG. 4B.

Figure 5A:
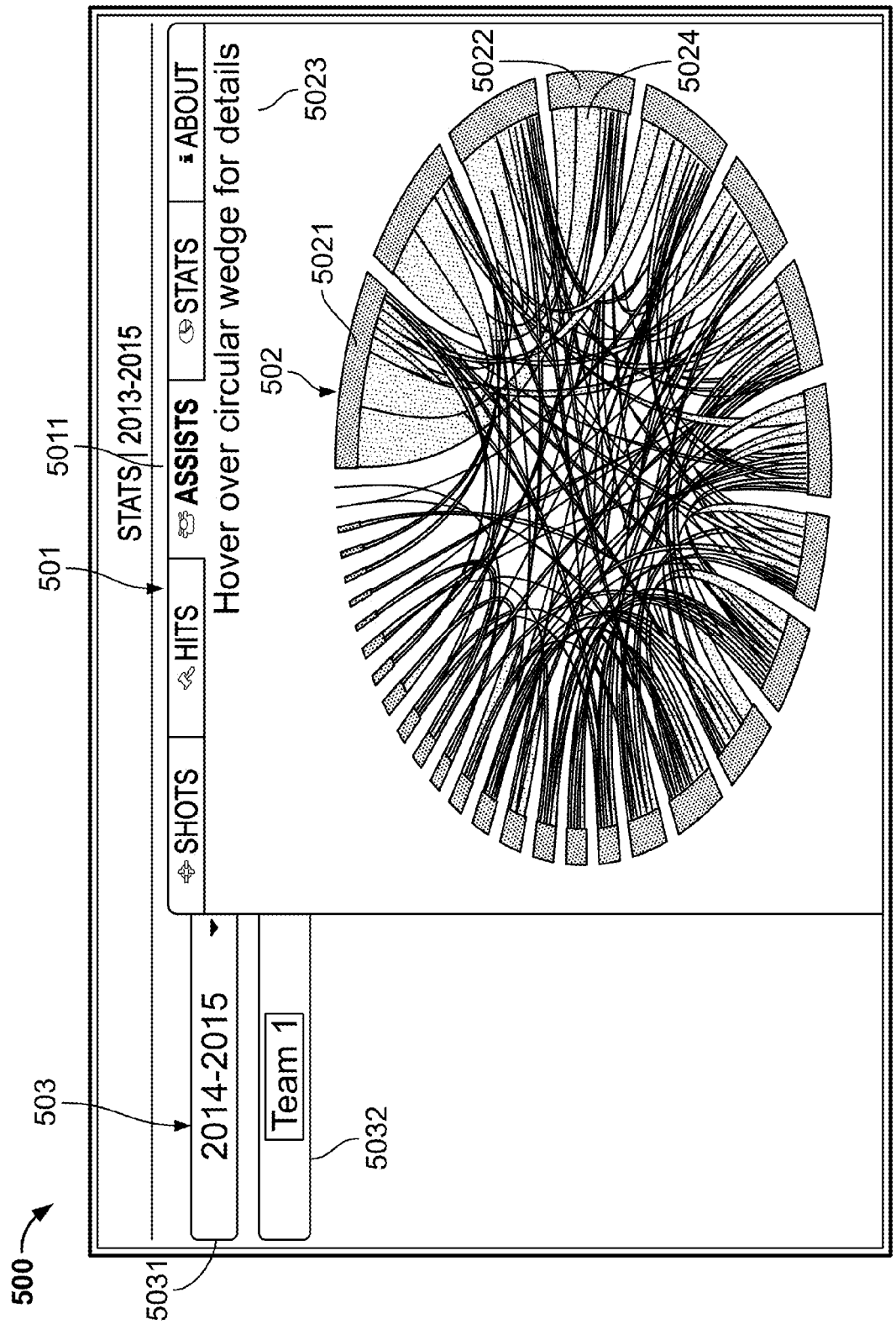
FIGS. 5A-5B illustrate circular wedge visualization for display of geocoded assists data.
Figure 5B:
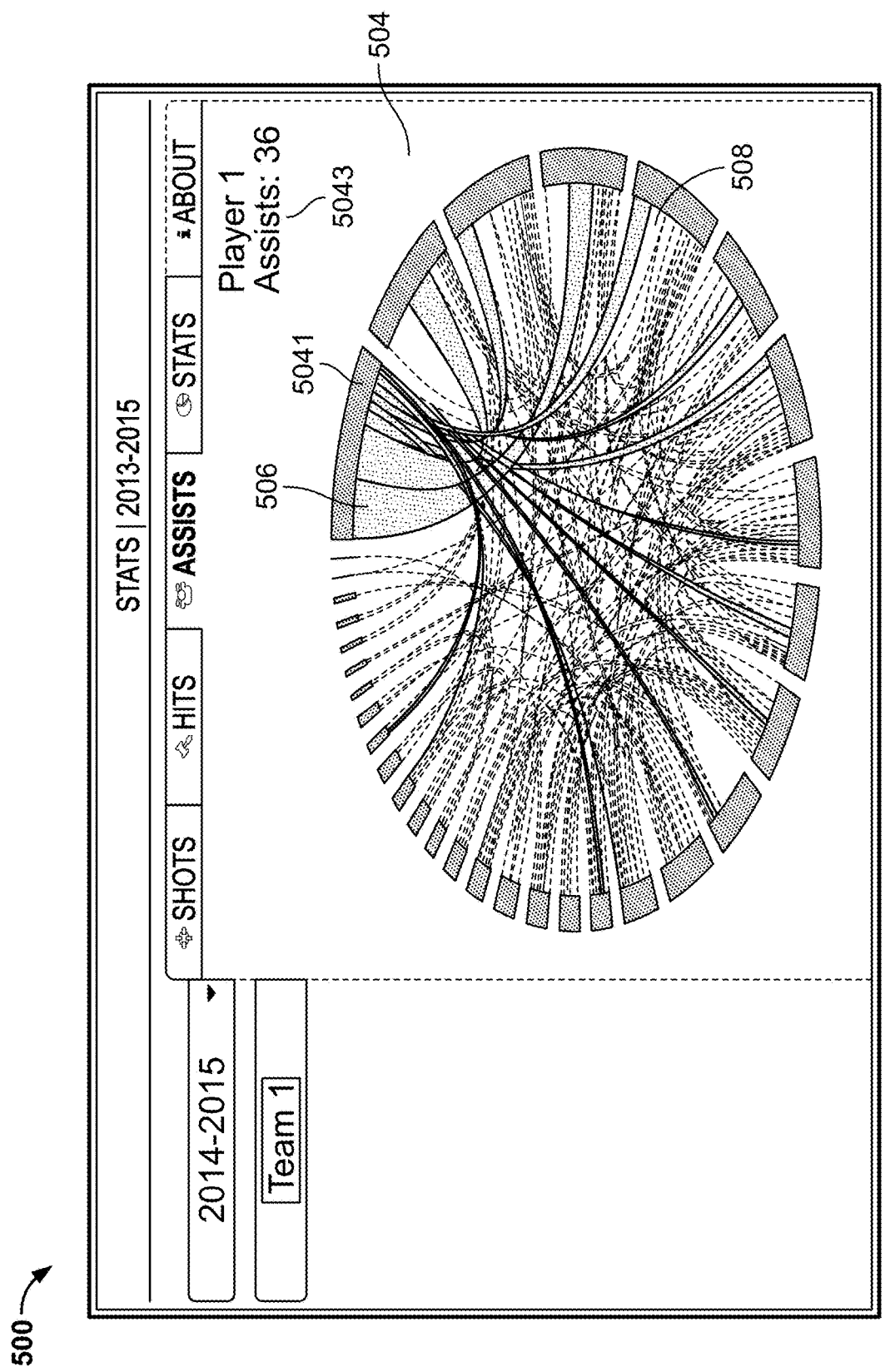

FIGS. 5A-5B illustrate circular wedge visualization for display of geocoded assists data. As shown in FIG. 5A, a circular wedge 502 is displayed after assists tab 5011 is selected from the display mode selection 501. The circular wedge 502 in FIG. 5A represents the assists for team 1 5032 and is for season 5031 of 2014-2015. The circular wedge 502 is selectable by using the additional attribute category 503. Each continuous outside edge may represent a player and the length may represent the assists that player made. For example, as shown in FIG. 5A, the longest edge 5021 may represent player 1 and because the edge for this player is the longest among the team 1, the player 1 may have made the most assists 5021 among the team 1. The connections between the outer edges may represent the assists between the two players. For example, the curve connection 5024 represents the assists between player 1 5021 and another player 5022 in team 1.

FIG. 5A also displays the message such as "hover over circular wedge for details" 5023. FIG. 5B shows an example when a mouse cursor hovers over the outer edge for player 1 5021. FIG. 5B shows a similar circular wedge 504 and the circular wedge 502 in FIG. 5A. As shown in FIG. 5B, the assists between player 1 5041 to other players are highlighted 506. The assists 508 that may not relate to player 1 5041 may be greyed out. FIG. 5B also shows that player 1 in team 1 made 36 assists 5043 for the season 2014-2015.

Figure 6:
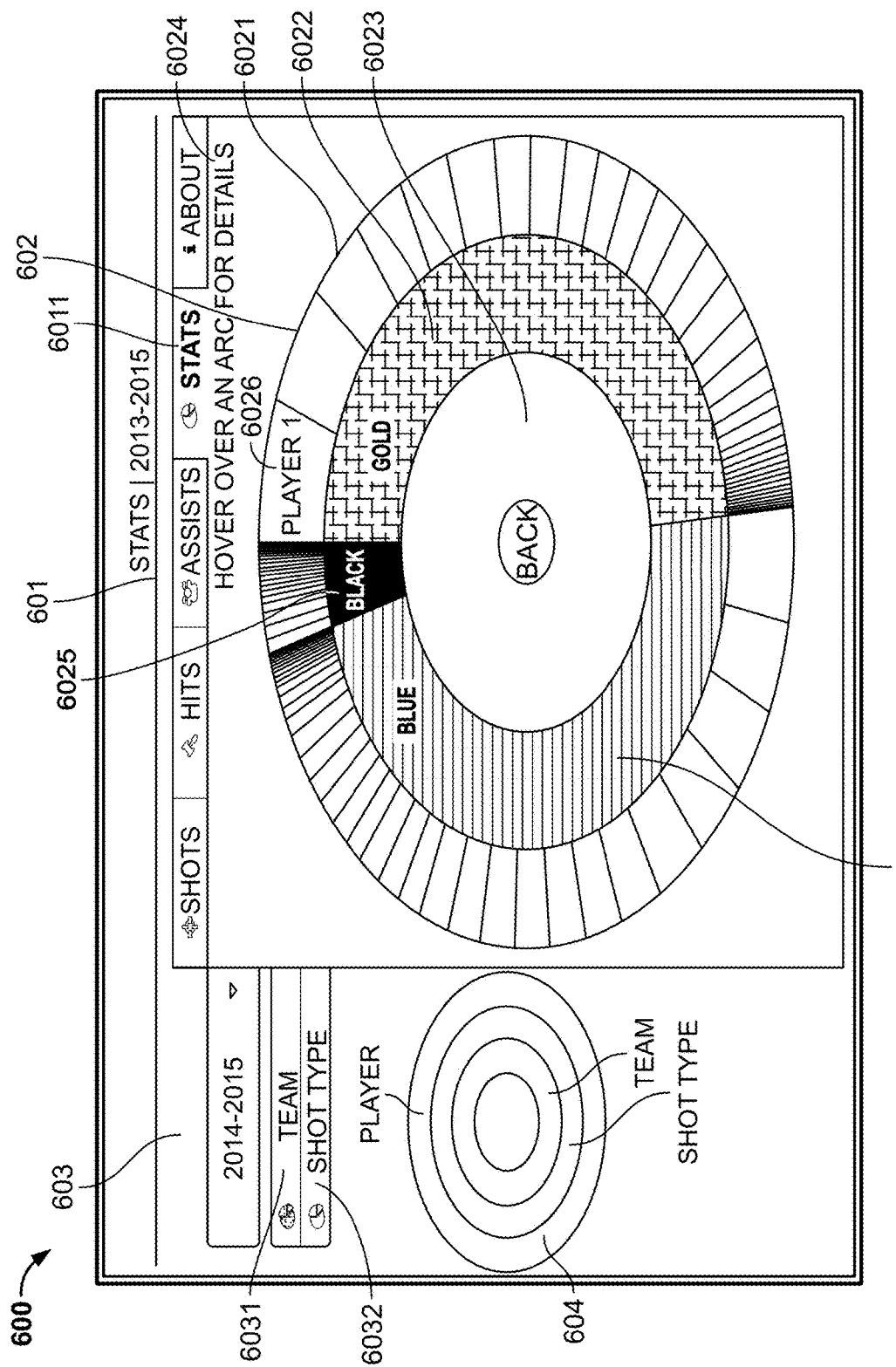
FIG. 6 shows an example of wheel format visualization for display of geocoded data.

FIG. 6 shows an example of wheel format visualization for display of geocoded data. As shown in FIG. 6, a shot wheel 602 is displayed after the stats 6011 of display mode 601 is selected. The shot wheel 602 is for the season 603 of 2014-2015. The inner ring of the shot wheel 602 may represent the team, the outer ring 6021 may represent players, and middle ring may represent shot type as illustrated in the information area 604 of FIG. 6. The shot wheel 602 displayed in FIG. 6 can be for one team or multiple teams, the shot types of goals(black) 6025, on target (gold) 6022 and missed (blue) 6024 are shown in FIG. 6. Individual players of team or teams of the inner ring are displayed on the outer ring 6021. The players are grouped for each type of shots. Because there are three types of shots, each player may be displayed multiple times in the outer ring. The length of the outer ring of each player may represent the number of shots that player made for the shot type. In FIG. 6, the longest outer edge 6026 represents that player 1 made most shots on target for the season 2014-2015. Table 2 shows an example of data structure for show wheel.

TABLE 2

Shot Wheel
    All
        Goals
            Team
                Players
                    Number of Shots
        On Target
            Team
                Players
                    Number of Shots
        Missed Shots
            Team
                Players
                    Number of Shots
    All
        Team
            Goals
                Players
                    Number of Shots
            On Target
                Players
                    Number of Shots
            Missed Shots
                Players
                    Number of Shots FIG. 6 also shows the options for team 6031 and shot type 6032. The shot wheel shown in FIG. 6 is for the option team 6031. When the option shot type 6032 is selected, the middle ring of the shot wheel may be changed from shot type to team, and the inner ring may be changed from team to shot type. The shot wheel may provide different views of shots for one or more teams and players when the different options are provided.

Figure 7:
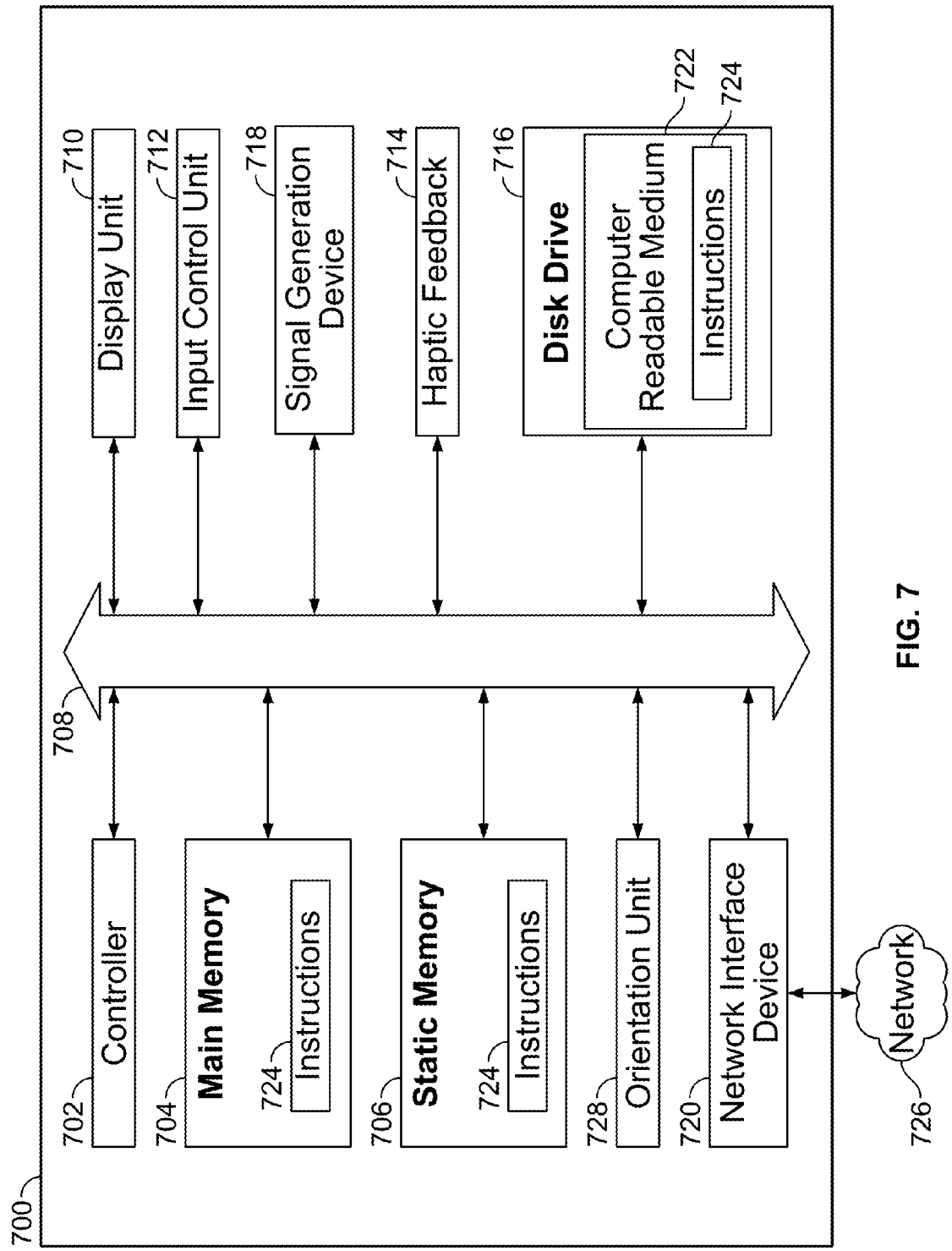
FIG. 7 illustrates an example of a computer system that may be used for generating visualizations.

FIG. 7 illustrates an example of a computer system that may be used for generating visualizations. The computer system 700 may include an orientation unit 728 that includes any combination of one or more gyroscope(s) and accelerometer(s).

The computer system 500 may also include a network interface device 720 to allow the computer system 700 to communicate via wireless, or wired, communication channels with other devices. The network interface device 720 may be an interface for communicating with another computer system via a Wi-Fi connection, Bluetooth connection, Near Frequency Communication connection, telecommunications connection, internet connection, wired Ethernet connection, or the like. The computer system 700 may also optionally include a disk drive unit 716 for accepting a computer readable medium 722. The computer readable medium 722 may include a set of instructions that are executable by the controller 702, and/or the computer readable medium 722 may be utilized by the computer system 700 as additional memory storage.

In a particular embodiment, as depicted in FIG. 7, the disk drive unit 716 may include a computer-readable medium 722 in which one or more sets of instructions 524, such as software, can be embedded. Further, the instructions 724 may embody one or more of the methods, processes, or logic as described herein. In a particular embodiment, the instructions 724 may reside completely, or at least partially, within the main memory 704, the static memory 706, and/or within the controller 702 during execution by the computer system 700. The main memory 704 and the controller 702 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 700 may encompass software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 722 that includes instructions 724 or receives and executes instructions 724 responsive to a propagated signal; so that a device connected to a network 726 can communicate voice, video or data over the network 726. Further, the instructions 724 may be transmitted or received over the network 726 via the network interface device 720.

While the computer-readable medium 724 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 722 can include a solid-state memory such as a memory card or other package that houses one or more non-volatile read-only memories, such as flash memory. Further, the computer-readable medium 722 can be a random access memory or other volatile re-writable memory. Additionally, the computer-readable medium 722 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 722 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by power systems, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The principles described herein may be embodied in many different forms. Not all of the depicted components may be required, however, and some implementations may include additional components. Variations in the arrangement and type of the components may be made without departing from the spirit or scope of the claims as set forth herein. Additional, different or fewer components may be provided.

Reference throughout this specification to "one example," "an example," "examples," "one embodiment," "an embodiment," "example embodiment," or the like in the singular or plural means that one or more particular features, structures, or characteristics described in connection with an embodiment or an example is included in at least one embodiment or one example of the present disclosure. Thus, the appearances of the phrases "in one embodiment," "in an embodiment," "in an example embodiment," "in one example," "in an example," or the like in the singular or plural in various places throughout this specification are not necessarily all referring to the same embodiment or a single embodiment. Furthermore, the particular features, structures, or characteristics may be combined in any suitable manner in one or more embodiments or examples.

The terminology used in the description herein is for the purpose of describing particular examples only and is not intended to be limiting. As used herein, the singular forms "a," "an," and "the" are intended to include the plural forms as well, unless the context clearly indicates otherwise. Also, as used in the description herein and throughout the claims that follow, the meaning of "in" includes "in" and "on" unless the context clearly dictates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

The exemplary environment may include a server, a client, and a communication network. The server and the client may be coupled through the communication network for information exchange, such as sending/receiving identification information, sending/receiving data files such as splash screen images, etc. Although only one client and one server are shown in the environment, any number of terminals or servers may be included, and other devices may also be included.

The described communication between devices may include any appropriate type of communication network for providing network connections to the server and client or among multiple servers or clients. For example, communication network may include the Internet or other types of computer networks or telecommunication networks, either wired or wireless. In embodiments, the disclosed methods and apparatus may be implemented, for example, in a wireless network that includes at least one client.

In some cases, the client may refer to any appropriate user terminal with certain computing capabilities, such as a personal computer (PC), a work station computer, a server computer, a hand-held computing device (tablet), a smart phone or mobile phone, or any other user-side computing device. In various embodiments, the client may include a network access device. The client may be stationary or mobile.

A server, as used herein, may refer to one or more server computers configured to provide certain server functionalities, such as database management and search engines. A server may also include one or more processors to execute computer programs in parallel.

It should be noticed that, the embodiments/examples and the features in the embodiments/examples may be combined with each other in a no conflict condition. The inventive aspects will become apparent from the detailed description when taken in conjunction with the accompanying drawings.

It should be noticed that, the steps illustrated in the flowchart of the drawings may be performed in a set of computer devices using executable program code. And the order of the steps may be different from that in the drawings under some status, although an example logic order is shown in the flowchart.

It is to be understood that, all examples provided above are merely some of the preferred examples of the present disclosure. For one skilled in the art, the present disclosure is intended to cover various modifications and equivalent arrangements included within the principle of the disclosure.

The invention claimed is:

1. A system comprising:
   a memory storing time-series geocoded data;
   visualization circuitry in communication with the memory, the visualization circuitry configured to:
      access the time-series geocoded data from the memory;
      obtain activity data that is embedded with the time-series geocoded data for a plurality of different types of activities;
      develop relationship data according to the obtained activity data to reflect different types of relationships among the time-series geocoded data;
      select a data display mode from a plurality of pre-determined data display modes for the time-series geocoded data based on the different types of activities and the different types of relationships; and
      process the time-series geocoded data by:
         receiving a selection of the data display mode;
         generating an area map for the selected data display mode;
         filtering the time series geocoded data to obtain a subset of data based on the data display mode;
         associating the relationship data with the filtered time series geocoded data;
         transforming the filtered time series geocoded data and the relationship data to displayable data according to the activity data, the relationship data and the selected data display mode;
         generating a display of the displayable data in the area map according to the relationship data and the activity data; and
         displaying, with the area map, a plurality of filters configured based on the selected display mode for further filtering the time series geocoded data; and
      wherein the plurality of pre-determined data display modes comprises at least a mode for displaying concentric rings of the activity data or the relationship data comprising at least an inner ring segmented into multiple segments to represent categories of one of the different types of activities and an outer ring having multiple portions corresponding to the multiple segments of the inner ring each further segmented to represent different entities carrying out the corresponding category of one of the different types of activities, and wherein at least one of the different entities is represented in more than one portion of the outer ring.

2. The system of claim 1, wherein the plurality filters comprise at least one of: 1) time period, 2) a first attribute category, and 3) a second attribute category.

3. The system of claim 2, wherein the plurality of filters that are used by the visualization circuitry for filtering are applied by:
   receiving a selection of a time period to select a first subset of the time series geocoded data;
   receiving a selection of a first attribute category of geo-coded data to select a second subset of the time series geocoded data;
   receiving a selection of a second attribute category to select a third subset of the time series geocoded data; and
   retrieving the filtered time series geocoded data commonly contained in the first subset, second subset and third subset of the time series geocoded data.

4. The system of claim 1, wherein the activity data comprises shots, hits, and assists of a player in a hockey game and the relationship data comprises passes and statistical data derived from the activity data, wherein the shots, the hits or assist are displayed in the area map that mimics a sports playing field.

5. The system of claim 1, wherein the relationship data comprises a matrix for each team in a sports competition to show passing to and from each player on the team.

6. The system of claim 1, wherein the multiple segments of the inner ring represent goals, on target shots, and missed shots in a sports competition for a team, and wherein the outer ring is segmented to represent numbers of goals, on target shots, and missed shots of players of the team.

7. The system of claim 6, where the concentric rings further comprise a ring inside the inner ring representing the team.

8. The system of claim 1, wherein the area map is a sports playing field format that comprises hexagons, wherein the hexagons represent accuracy of shots which is calculated by counting a number of shots on target plus a number of goals and dividing by a total number of shots in an area of the hexagons.

9. The system of claim 1, wherein the relationship data comprises a direction and a distance of passing from one player to another player in a sports competition.

10. The system of claim 1, wherein the relationship data comprises a hit relationship showing an offensive hit and a defensive hit, wherein both the offensive hit and the defensive hit are displayed in the area map.

11. A method comprising:
storing time-series geocoded data in a memory;
accessing, by a visualization circuitry, the time-series geocoded data from the memory;
obtaining, by a visualization circuitry, activity data that is embedded with the time-series geocoded data for plurality of different types of activities;
developing, by a visualization circuitry, relationship data according to the obtained activity data to reflect different types of relationships among the time-series geocoded data;
selecting, by a visualization circuitry, a data display mode from a plurality of pre-determined data display modes for the time-series geocoded data based on the different types of activities and the different types of relationships;
processing, by a visualization circuitry, the time-series geocoded data by:
receiving a selection of the data display mode;
generating an area map for the selected data display mode;
filtering the time series geocoded data to obtain a subset of data based on the data display mode;
associating the relationship data with the filtered time series geocoded data;
transforming the filtered time series geocoded data and the relationship data to displayable data according to the activity data, the relationship data and the selected data display mode;
generating a display of the displayable data in the area map according to the relationship data and the activity data; and
displaying, with the area map, a plurality of filters configured based on the selected display mode for further filtering the time series geocoded data; and
wherein the plurality of pre-determined data display modes comprises at least a mode for displaying concentric rings of the activity data or the relationship data comprising at least an inner ring segmented into multiple segments to represent categories of one of the different types of activities and an outer ring having multiple portions corresponding to the multiple segments of the inner ring each further segmented to represent different entities carrying out the corresponding category of one of the different types of activities, and wherein at least one of the different entities is represented in more than one portion of the outer ring.

12. The method of claim 11, wherein the plurality of filters comprise at least one of: 1) time period, 2) a first attribute category, and 3) a second attribute category.

13. The method of claim 12, wherein the plurality of filters that are used by the visualization circuitry for filtering are applied by:
receiving a selection of a time period to select a first subset of the time series geocoded data;
receiving a selection of a first attribute category of geocoded data to select a second subset of the time series geocoded data;
receiving a selection of a second attribute category to select a third subset of the time series geocoded data; and
retrieving the filtered time series geocoded data commonly contained in the first subset, second subset and third subset of the time series geocoded data.

14. The method of claim 11, wherein the activity data comprises shots, hits, and assists of a player in a hockey game and the relationship data comprises passes and statistical data derived from the activity data, wherein the shots, the hits or assist are displayed in the area map that mimics a sports playing field.

15. The method of claim 11, wherein the relationship data comprises a matrix for each team in a sports competition to show passing to and from each player on the team.

16. The method of claim 11, wherein the multiple segments of the inner ring represent goals, on target shots, and missed shots in a sports competition for a team, and wherein the outer ring is segmented to represent numbers of goals, on target shots, and missed shots of players of the team.

17. The method of claim 16, where the concentric rings further comprise a ring inside the inner ring representing the team.

18. The method of claim 11, wherein the area map is a sports playing field format that comprises hexagons, wherein the hexagons represent accuracy of shots which is calculated by counting a number of shots on target plus a number of goals and dividing by a total number of shots in an area of the hexagons.

19. The method of claim 11, wherein the relationship data comprises a direction and a distance of passing from one player to another player in a sports competition.

20. The method of claim 11, wherein the relationship data comprises a hit relationship showing an offensive hit and a defensive hit, wherein both the offensive hit and the defensive hit are displayed in the area map.

21. A system comprising:
a memory storing time-series geocoded data;
visualization circuitry in communication with the memory, the visualization circuitry configured to:
access the time-series geocoded data from the memory;
obtain activity data that is embedded with the time-series geocoded data for a plurality of different types of activities;
develop relationship data according to the obtained activity data to reflect different types of relationships among the time-series geocoded data;
select a data display mode from a plurality of pre-determined data display modes for the time-series geocoded data based on the different types of activities and the different types of relationships; and
process the time-series geocoded data by:
receiving a selection of the data display mode;
generating an area map for the selected data display mode;
filtering the time series geocoded data to obtain a subset of data based on the data display mode;
associating the relationship data with the filtered time series geocoded data;

transforming the filtered time series geocoded data and the relationship data to displayable data according to the activity data, the relationship data and the selected data display mode;

generating a display of the displayable data in the area map according to the relationship data and the activity data; and displaying, with the area map, a plurality of filters configured based on the selected display mode for further filtering the time series geocoded data; and wherein the plurality of pre-determined display data modes comprises at least a mode for displaying circularly arranged wedges of varied circumferential lengths with at least one connection curve having two opposite ends with different widths terminating on two of the wedges, the wedges representing members of a group of entities, the lengths of the wedges representing data values for one of the different types of activities by the members of the group of entities, and the widths of the opposite ends of the connection curves representing relationship between the members represented by the two connected wedges with respect to the one the different types of activities.

* * * * *